United States Patent [19]

Eernstman et al.

[11] 4,132,690

[45] Jan. 2, 1979

[54] ADHESIVE POLYAMIDE RESIN COMPOSITIONS CONTAINING HIGH ACID NUMBER COPOLYMERS

[75] Inventors: Tjeerd Eernstman, Augsburg, Germany; Christopher J. Auger, Tervuren, Belgium; Emile M. Devroede, Buizingen, Belgium

[73] Assignee: Allied Chemical Corporation, Morristown, N.J.

[21] Appl. No.: 727,311

[22] Filed: Sep. 27, 1976

[51] Int. Cl.$^2$ .................................................. C09J 3/14
[52] U.S. Cl. ........................... 260/23 AR; 260/18 N; 260/857 L; 260/857 UN
[58] Field of Search ......... 260/18 N, 857 UN, 857 L, 260/23 AR

[56] References Cited

U.S. PATENT DOCUMENTS

| | | | |
|---|---|---|---|
| 3,484,403 | 12/1969 | Brunson et al. | 260/27 R |
| 3,645,932 | 2/1972 | Harrison et al. | 260/3 |
| 3,646,154 | 2/1972 | Marans et al. | 260/18 N |
| 3,658,741 | 4/1972 | Knutson et al. | 260/29.6 H |
| 3,676,400 | 7/1972 | Kohan et al. | 260/857 L |
| 3,787,342 | 1/1974 | Berry et al. | 260/24 |
| 3,868,433 | 2/1975 | Bartz et al. | 260/876 R |

FOREIGN PATENT DOCUMENTS

| | | | |
|---|---|---|---|
| 740501 | 8/1966 | Canada | 260/857 L |
| 1440810 | 6/1976 | United Kingdom. | |

*Primary Examiner*—Eugene C. Rzucidlo
*Attorney, Agent, or Firm*—Alan M. Doernberg; Michael S. Jarosz; Jay P. Friedenson

[57] ABSTRACT

Adhesive polyamide resin compositions, such as hot melts, containing conventional components are improved by inclusion of a normally solid, homogeneous copolymer of ethylene and an unsaturated carboxylic acid having an acid number of at least about 100 and a number average molecular weight between 500 and 5,000.

14 Claims, No Drawings

4,132,690

ADHESIVE POLYAMIDE RESIN COMPOSITIONS CONTAINING HIGH ACID NUMBER COPOLYMERS

BACKGROUND OF THE INVENTION

Polyamide resins are widely used in hot melt coating and adhesive applications. However, polyamide coatings cannot be bonded directly to certain substrates, such as metal substrates while at the same time providing all of the desired properties for such compositions. Hence, it is desired that adhesive compositions exhibit uniformly sharp melting points, good moisture vapor barrier properties, good chemical, solvent and product resistance, excellent adhesion to a wide variety of surfaces such as treated and untreated polyolefin and polyester films, paper, aluminum foil, as well as metals. In addition, such coatings should exhibit good compatability with other film forming resins, tackifiers, and plasticizers while at the same time exhibit flexibility combined with toughness.

Although as of the present time various attempts have been made to incorporate various polyolefins into polyamide resin adhesive compositions to improve some of the aforementioned properties, in general, the art has been deficient in providing compatible admixtures of polyamide resin compositions with polyethylenes. Blends of these materials have been known to be low key in appearance when hot and produce brittle and grainy films upon cooling and, hence, it has been impractical to produce useful hot melt coating and adhesive compositions and the like, based on such blends.

DESCRIPTION OF THE PRIOR ART

Blends of polyamide resins and certain polyolefins, including copolymers of ethylene with carboxylic acids, are known in the preparation of thermoplastic hot melt adhesive compositions. For example, U.S. Pat. No. 3,868,433, issued Feb. 25, 1975, describes thermoplastic adhesive compositions formed by the inclusion of acid or acid derivative grafted polyolefins, particularly acrylic acid-grafted polypropylene, polyethylene and/or ethylenepropylene polymer substances and U.S. Pat. No. 3,484,403 issued Dec. 16, 1969, discloses the blending of a polyamide resin with a polyolefin which has been modified by reaction with an unsaturated dicarboxylic acid such as fumaric acid; however, the acid components of the polyolefins of these patents fail to exhibit sufficiently high acid numbers to thereby improve the compatibility of the polyamides with the polyolefin and hence, overcome some of the deficiencies normally characteristic of such blends. Other patents disclosing typical hot melt adhesive compositions based on polyamide resins include U.S. Pat. No. 3,787,342, issued Jan. 22, 1974, U.S. Pat. No. 3,646,154, issued Feb. 29, 1972, U.S. Pat. No. 3,626,026, issued Dec. 7, 1971, and U.S. Pat. No. 3,907,733, issued Sept. 23, 1975.

SUMMARY OF THE INVENTION

The hot melt adhesive compositions of the present invention comprise admixtures of about 15 to 99 weight percent of a conventional polyamide resin adhesive base component, which resin serves as the principal film former and tackifying constituent and correspondingly, about 85 to 1 weight percent of a normally solid homogeneous copolymer of ethylene and an unsaturated carboxylic acid having a high acid number, i.e. of at least about 100 and a number average molecular weight between 500 and 5,000, said copolymer containing at least a major portion of ethylene, by weight, which copolymer is compatible with said resin and functions to impart additional tack, flexibility, and lower viscosity. These compositions may also contain additional tackifying agents, diluents and minor amounts of various ancillary constituents useful in conventional hot-melt polyamide resin adhesive compositions.

The compositions of the present invention exhibit improved adhesive properties over known blends of polyamides and polyethylene derivatives, such as, copolymers of ethylene with unsaturated carboxylic acids, which copolymers exhibit low, e.g. below about 70, acid numbers. The compositions of the present invention can be adhered directly to substrates by simply hot pressing, for example, compacting the adhesive composition blend to the substrate at elevated temperatures, e.g. above about 300° F., for a short time so as to ensure uniform contact of the blend and substrate, and cooling. Compositions of the present invention have excellent physical properties and surprisingly good adhesion to a variety of substrates, as above enumerated, particularly metals.

DETAILED DESCRIPTION OF THE INVENTION

The hot-melt adhesive compositions of the present invention comprise a compatible admixture of a conventional polyamide resin adhesive base component and a normally solid, homogeneous polymer of ethylene and unsaturated carboxylic acid having an acid number of at least about 100 and a number average molecular weight between 500 and 5000, said copolymer containing at least a major portion of ethylene, by weight. These compositions comprise between about 15 and 99 and preferably between about 30 and 70 percent by weight of the polyamide base component and correspondingly, between about 85 and 1, preferably, between about 70 and 30 percent, by weight, of the copolymer.

The polyamide resins used in the compositions of the present invention are thermoplastic reaction products of dicarboxylic acids with diamines and are well known in the hot-melt adhesive art. The particular dicarboxylic acids used in preferred forms of the present invention for preparation of such polyamide resins are polymerized fatty acids or dimer acids made by polymerizing unsaturated fatty acids which dimer acids consisting essentially of a mixture of about 36 carbon atom dicarboxylic acids and usually also contain several isomeric dimers together with a small amount of trimer and higher polymers. When these dicarboxylic acids are condensed with diamines, such as ethylene diamine or other low molecular weight aliphatic or aromatic diamine, there are provided polyamide resins of a generally linear nature and a relatively neutral character. In general, these polyamides are of relatively high molecular weight, generally between about 1,000 and 12,000, and provide an exceptional combination of properties including outstanding adhesion to a variety of substrates, which properties include high tensile strength with good elongation, high bond strength, flexibility and toughness, low water absorption, and retention of physical properties on aging. Present commercially available polyamide resins for hot-melt adhesive formulations, as well as those polyamide resins useful in the compositions of the present invention, exhibit Ring and Ball softening points between about 25° and 200° C.

Although normally only one polyamide resin is employed as a principal constituent of the hot-melt adhesive composition, if desired, a blend of several polyamide resins may be employed. Modified and improved polyamide resin compositions are believed useful in the compositions of this invention.

The normally solid homogeneous copolymers essential to the hot-melt adhesive compositions of this invention are prepared by subjecting ethylene and the appropriate comonomer to reaction along with a chain transfer agent and free radical catalyst under conditions such that all are substantially in the vapor phase with turbulent agitation within a temperature between about 100° to 300° C., and a high pressure between 150 and 1,000 atmospheres, and such that equilibrium is established and a thermally self-sustaining reaction is maintained, desirably at substantially constant temperature pressure varying by no more than about ±10 percent to form a liquid product substantially continuously withdrawn from the reaction zone, preferably at approximately the rate at which it is formed, the ethylene and comonomer being maintained in the reaction zone and fed thereto at approximately the proportion of ethylene and comonomer desired in the product over any substantial period of operation, desirably at a substantially constant ratio varying no more than about ±10 percent based on the ethylene, the ratio of percent comonomer in the product to percent comonomer in the feed being within the range of 0.7:1 to 1.8:1, desirably 1:1 to 1.6:1, and the proportion of unreacted materials withdrawn from the reaction being accordingly adjusted. Such copolymers normally have a number average molecular weight between 500 and 5,000, preferably 2,000 and 4,000, a viscosity ranging from about 300 to 1,000 cps at 140° C. (Brookfield), a Ring and Ball softening point between about 70° and 100°C., and exhibit an acid number of at least about 70, preferably at least about 100, milligrams potassium hydroxide per gram of copolymer (mg KOH/g). These copolymers, as well as their preparation, are described and claimed in U.S. Pat. No. 3,658,741, issued Apr. 25, 1972, to the same assignee of the present application, the disclosure of which is hereby incorporated by reference. The preferred copolymers useful in the compositions of the present invention comprise a copolymer of ethylene and a carboxylic acid which is a member of the group consisting of unsaturated monocarboxylic acids of 3 to 6 carbon atoms, an unsaturated dicarboxylic acid of 4 to 8 carbon atoms, and mixtures thereof. Illustrative copolymers include unsaturated acids copolymerized with ethylene such as acrylic acid, methacrylic acid, crotonic acid, maleic acid and fumaric acid.

In order to realize the advantageous properties of the hot-melt polyamide resin compositions of the present invention, it is essential to employ a copolymer of the type specified which exhibits an acid number of at least 70, and preferably at least 100, mgKOH/g. Due to the insoluble character of such copolymers, it is necessary that an objective standard procedure be employed to determine accurately the acid number of the copolymer. A typical satisfactory procedure for determining the acid number of the copolymers employed herein comprises heating to boiling and reflux for no more than two minutes 3 grams of the copolymer sample in 75 milliliters of toluol (industrial pure grade), adding five drops of phenolphthalein indicator (powder, reagent grade, — one gram dissolved in 50 milliliters of methanol and diluted to 100 milliliters with distilled water) and titrating immediately with 0.0535 N alcoholic potassium hydroxide to a pink color that persists for thirty seconds. At the indicated Normality of the alcoholic KOH, the acid number is equal to the milliliters used in the titration; in the event the Normality and/or copolymer sample weight are not as specified above, then the acid number is calculated according to the formula:

$$\text{Acid number} = \frac{V \times N \times 56.1}{W}$$

where:
V = milliliters of KOH
N = Normality of KOH
56.1 = equivalent weight of KOH
W = grams of copolymer sample.

Admixing of the polyamide resin with the copolymer may be carried out by simply heating above the melting point and mixing together the constituents by any common procedure, including mechanical mixing, blending on hot rolls, mixing in the melt, or mixing in solution and then removing the solvent. A satisfactory procedure is to stir the polyamide resin and copolymer together under an inert atmosphere in a flask immersed in a bath. The preferred method is to blend the polyamide resin and copolymer in powder or granular form in an extruder.

If desired, the hot-melt adhesive compositions of the present invention may also contain additional tackifying agents, diluents and/or minor amounts of various other ancillary constituents as are known to the art. Typical tackifiers which may be employed in hot-melt adhesive compositions of the invention comprise resins and/or polymeric materials such as natural rosins, hydrogenated rosins, glycerol esters of fumaric-modified resins as described in U.S. Pat. No. 3,787,346, polyterpenes, terpenephenolics, resin esters, atactic polypropylene, petroleum hydrocarbon resins, polybutenes and chlorinated biphenyl resins. Illustrative diluents which may likewise be employed in the instant compositions include, for example petroleum waxes such as paraffin and microcrystalline wax, or synthetic waxes such as Fischer-Tropsch wax, or polyethylene waxes described in U.S. Pat. Nos. 2,504,400; 2,683,141; and 2,712,534. Other useful ancillary constituents employable in the composition of the invention include fillers, pigments, dyes, stabilizers, anti-oxidants and the like. Illustrative fillers are titanium dioxide, diatomaceous earth, clay and the like. To avoid discoloration, gelation, or physical separation of the composition's constituents during excessive or prolonged heating of its melt state, stabilizers may be included, illustrative thereof, being calcium stearate, sodium sebacate, sodium benzoate and the like. When used in a hot melt composition, the sum total of all such various included ancillary constituents generally will not normally exceed about 25 percent by weight of the composition; in any event, the amounts of each such ingredient including tackifiers and diluents referred to hereinabove, should not appreciably detrimentally adversely affect the adhesive properties of the compositions to such an extent as to render the composition not useful for the particular hot-melt application contemplated.

The invention will be further illustrated by the following examples, but it is understood that the invention is not meant to be limited to the details described therein; in the examples, all parts and percentages are by weight unless otherwise noted.

EXAMPLES 1-15

Various amounts of a solid, homogeneous copolymer of ethylene and acrylic acid prepared according to U.S. Pat. No. 3,658,741 having a density of 0.95, a number average molecular weight of 2500 (as determined by vapor phase osmometry), a Ring and Ball softening point of 86° C (as determined by ASTM E28), an average Brookfield viscosity of 475 cps at 140° C, and an acid number of 120 mgKOH/g. were melt-blended with (A) Versalon 1155 polyamide resin (Schering AG), a polyamide resin having a softening point of about 155° C.; (B) Emerez UE 80237 polyamide resin (Unilever-Emery); and (C) Emerez 1553 polyamide resin (Unilever-Emery). Peel strength determinations (T- peel with angled specimens) were carried out in accordance with German Standard DIN 53 282 (September 1968), employing five (5) samples each of aluminum foil strips, 3 centimeters wide and 17.5 centimeters long of 0.5 mm thickness, previously cleaned with isopropanol. The strips, supported by a polytetrafluoroethylene sheet were heated to about 180° C. on a press, the hot-melt blend indicated in Table I, below, was applied in a thin stream around the edges and lengthwise along the center of each strip and a second strip was placed upon the first followed by a polytetrafluoroethylene sheet. After applying a pressure of about 1000 lbs/cm² through the press for one (1) minute at 180° C., the bonded metal strips were allowed to cool to room temperature; peel strengths were determined after two (2) hours by an Instron (Model No. 1026) machine using a crosshead and chart speed of 50 mms at a full scale load range of 0 to 5 kgs.

Peel strength data are set forth in Table I, below:

TABLE I

| Ex. No. | Nature of Polyamide Resin in Blend | Percent of Copolymer in Blend | Initial Tear Kgs/cm | Peel, Kgs/cm |
|---|---|---|---|---|
| 1. | Versalon 1155 (control) | 0 | 0.147 | 0.153 |
| 2. | " | 20 | 0.460 | 0.253 |
| 3. | " | 40 | 0.816 | 0.573 |
| 4. | " | 60 | 0.972 | 0.555 |
| 5. | " | 80 | 0.630 | 0.489 |
| 6. | Emerez UE 80237 (control) | 0 | 0.115 | 0.114 |
| 7. | " | 20 | 0.445 | 0.332 |
| 8. | " | 40 | 1.072 | 0.584 |
| 9. | " | 60 | 1.196 | 0.675 |
| 10. | " | 80 | 0.437 | 0.406 |
| 11. | Emerez 1553 (control) | 0 | 0.478 | 0.427 |
| 12. | " | 20 | 1.885 | 0.683 |
| 13. | " | 40 | 1.506 | 0.630 |
| 14. | " | 60 | 4.641 | 1.230 |
| 15. | " | 80 | 0.788 | 0.517 |

It is evident from the above results that the blends of the invention exhibit superior adhesive properties as compared with polyamide compositions conventionally employed in hot-melt adhesive compositions. Furthermore, when cast into films, the blends exhibit good film-forming capability and produce transparent, haze-free, flexible products, thereby indicating a high degree of compatibility of the polyamide resins with the copolymer.

EXAMPLE 16

A blend containing forty (40) percent of a copolymer of ethylene and acrylic acid having a density of 0.93 gm/cc, a number average molecular weight of about 3000, a Ring and Ball softening point of 102° C., an average Brookfield viscosity of 650 cps at 140° C., and an acid number of 75 mg KOH/g was melt blended with Versalon 1155 polyamide and peel strength determined in accordance with the procedure described in Example 1-15 above; the product exhibited an initial tear of 0.403 and a peel strength of 0.344 Kgs/cm.

EXAMPLES 17-20

For comparison with the blend compositions of the present invention, Versalon 1155 polyamide resin was blended with various amounts of a copolymer of ethylene and acrylic acid prepared according to U.S. Pat. No. 3,658,741, said copolymer having a density of 0.93 g/cc, a number average molecular weight of about 3000, a Ring and Ball softening point of 108° C, an average Brookfield viscosity of 500 cps at 140° C., and an acid number of 40 mg KOH/g, and peel strength data determined in accordance with the procedure described in Examples 1-15, above; results are given below in Table II.

TABLE II

| Example No. | Nature of Polyamide Resin in Blend | Percent of Copolymer in Blend | Initial Tear Kgs/cm | Peel, Kgs/cm |
|---|---|---|---|---|
| 17. | Versalon 1155 | 20 | 0.019 | 0.102 |
| 18. | " | 40 | 0.166 | 0.156 |
| 19. | " | 60 | 0.101 | 0.115 |
| 20. | " | 80 | 0.108 | 0.093 |

Examples 17 to 20, as compared with the results of Examples 1 to 16, demonstrate the criticality of high acid number copolymers in providing good adhesion and compatible polyamide hot-melt blends.

We claim:

1. An adhesive composition comprising a compatible admixture of:
   (a) about 15 to 99 weight percent of a conventional polyamide adhesive base component; and correspondingly
   (b) about 85 to 1 weight percent of a normally solid, homogeneous copolymer of ethylene and an unsaturated carboxylic acid having an acid number of at least about 100 and a number average molecular weight between 500 and 5,000, said copolymer containing at least a major portion of ethylene by weight.

2. The composition of claim 1 wherein said polyamide is present in an amount of about 30 to 70 weight percent and said copolymer is present in a corresponding amount of between about 70 and 30 weight percent of the composition.

3. The composition of claim 1 wherein the copolymer is further characterized by having a number average molecular weight between about 500 and 5000 and the carboxylic acid of said copolymer is a member of the group consisting of unsaturated monocarboxylic acid of 3 to 6 carbon atoms, an unsaturated dicarboxylic acid of 4 to 8 carbon atoms, and mixtures thereof.

4. The composition of claim 3 wherein said copolymer has an acid number of at least 100 and a number average molecular weight between about 2000 and 4000.

5. The composition of claim 4 wherein the carboxylic acid of said copolymer is a member selected from the group consisting of acrylic acid, methacrylic acid, fumaric acid, maleic acid and mixtures thereof.

6. The composition of claim 5 wherein the carboxylic acid of said copolymer is acrylic acid.

7. The composition of claim 5 wherein the carboxylic acid of said copolymer is methacrylic acid.

8. The composition of claim 4 wherein the carboxylic acid of said copolymer is fumaric acid.

9. The composition of claim 4 wherein the carboxylic acid of said copolymer is maleic acid.

10. The composition of claim 1 which additionally contains a tackifier or a diluent.

11. An article of manufacture comprising at least two adherent materials joined with the composition of claim 1.

12. The composition of claim 1 wherein said polyamide has a molecular weight between about 1,000 and 12,000.

13. The composition of claim 1 wherein said copolymer has a viscosity of 300 to 1,000 cps at 140° C and a Ring and Ball Softening point between about 70° and 100° C.

14. The composition of claim 1 wherein said copolymer has a number average molecular weight between 2,000 and 4,000.

* * * * *